(12) United States Patent
Matsui

(10) Patent No.: US 12,447,338 B2
(45) Date of Patent: Oct. 21, 2025

(54) ELECTRICAL STIMULATION DEVICE AND ELECTRICAL STIMULATION METHOD

(71) Applicant: OSAKA UNIVERSITY, Osaka (JP)

(72) Inventor: Kazuhiro Matsui, Osaka (JP)

(73) Assignee: OSAKA UNIVERSITY, Osaka (JP)

( * ) Notice: Subject to any disclaimer, the term of this patent is extended or adjusted under 35 U.S.C. 154(b) by 259 days.

(21) Appl. No.: 18/280,209

(22) PCT Filed: Feb. 8, 2022

(86) PCT No.: PCT/JP2022/004796
§ 371 (c)(1),
(2) Date: Sep. 2, 2023

(87) PCT Pub. No.: WO2022/190738
PCT Pub. Date: Sep. 15, 2022

(65) Prior Publication Data
US 2024/0149060 A1    May 9, 2024

(30) Foreign Application Priority Data

Mar. 9, 2021 (JP) ................................. 2021-036935

(51) Int. Cl.
*A61N 1/36* (2006.01)
*A61B 5/313* (2021.01)
(Continued)

(52) U.S. Cl.
CPC .......... *A61N 1/36031* (2017.08); *A61B 5/313* (2021.01); *A61B 5/316* (2021.01); *A61N 1/0452* (2013.01)

(58) Field of Classification Search
CPC ...... A61B 5/313; A61B 5/7425; A61N 1/0452
See application file for complete search history.

(56) References Cited

U.S. PATENT DOCUMENTS

2012/0010531 A1*   1/2012  Bloch ................... A61B 5/224
                                                             600/587
2018/0093091 A1    4/2018  Brodard
(Continued)

FOREIGN PATENT DOCUMENTS

JP    2004-000698 A    1/2004
JP    2016-525390 A    8/2016
(Continued)

OTHER PUBLICATIONS

International Search Report for corresponding Application No. PCT/JP2022/004796, mailed Apr. 5, 2022.
(Continued)

*Primary Examiner* — Catherine M Voorhees
(74) *Attorney, Agent, or Firm* — Renner, Otto, Boisselle & Sklar, LLP

(57) ABSTRACT

The electrical stimulation device includes: positive and negative electrodes to be attached to epidermis of agonist-antagonist muscles acting on a target joint; a display unit; an EMG rehabilitation unit that detects an electromyogram of the agonist-antagonist muscles via the electrodes and outputs variation information corresponding to the detected electromyogram to the display unit; a FES rehabilitation unit that instructs motion of the agonist-antagonist muscles via the display unit and outputs a stimulation current signal corresponding to the instructed motion of the agonist-antagonist muscles to the electrodes; a model (inverse model) storage unit that stores models obtained beforehand and relating to target muscle characteristics, the models including: a model for converting the detected electromyogram into the variation information; and a model for converting information on the motion of the agonist-antagonist muscles into the stimulation current signal; and a rehabilitation (Continued)

processing unit that selectively executes the EMG rehabilitation unit and the FES rehabilitation unit.

8 Claims, 12 Drawing Sheets

(51) Int. Cl.
*A61B 5/316* (2021.01)
*A61N 1/04* (2006.01)

(56) References Cited

U.S. PATENT DOCUMENTS

2018/0333575 A1* 11/2018 Bouton .................. A61B 5/726
2020/0038653 A1*  2/2020 Sitaram .............. A61N 1/36003
2023/0039154 A1*  2/2023 Robison ................. A61B 5/313

FOREIGN PATENT DOCUMENTS

| JP | 2018-507763 A | 3/2018 | |
| WO | 2015003203 A | 1/2015 | |
| WO | WO-2015003203 A1 * | 1/2015 | ......... A61N 1/36003 |

OTHER PUBLICATIONS

Kazuhiro Matsui, et al., Equilibrium-point control of human elbow-joint movement by using multichannel functional electrical stimulation—Validation under isometric environment—, Transactions of the Society of Instrument and Control Engineers vol. 50, No. 11, 755/762 (2014).

Kazuhiro Matsui, et al., Analysis of equilibrium-point control model using two-channel functional electrical stimulation (FES) to extend elbow joint movement to an unconstrained environment on the horizontal plane, Biomedical Engineering vol. 53 No. 1 (Feb. 2015).

* cited by examiner

Experimental setup, top view (A) HEALTHY STATE  (B) AT THE ONSET OF STROKE  (C) LONG-TERM LYING IN BED

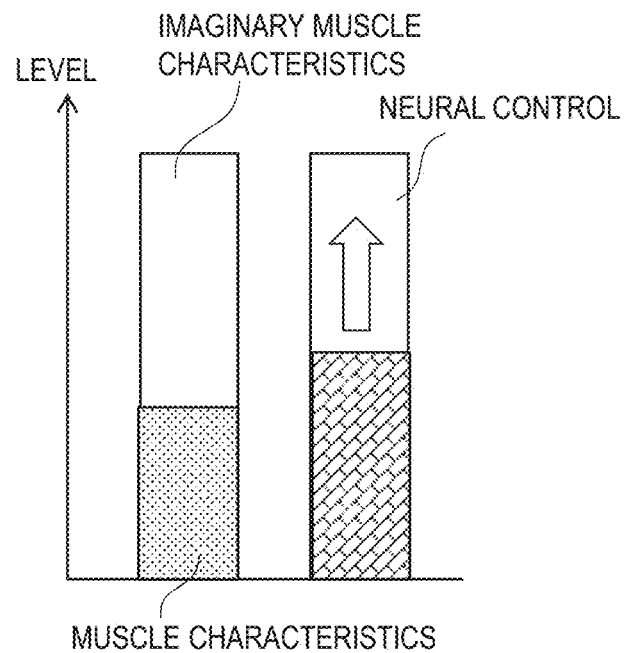
Fig.6A   NEURAL SYSTEM REHABILITATION
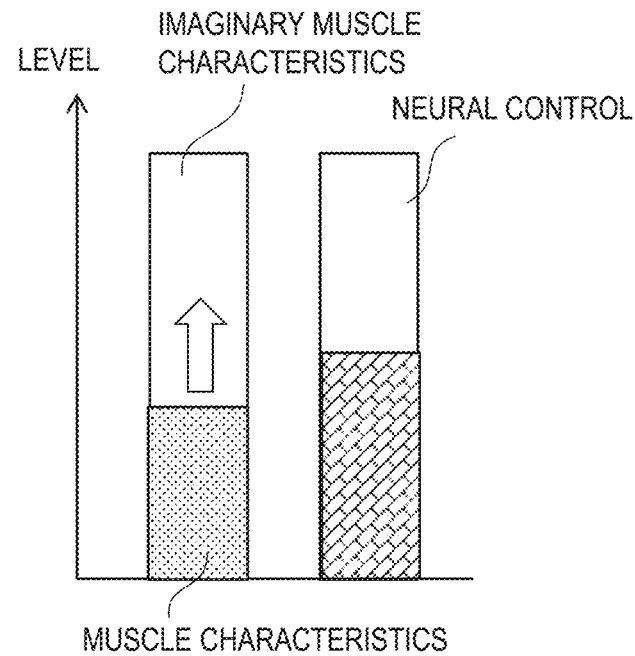
Fig.6B   MUSCULOSKELETAL SYSTEM REHABILITATION (A) HEALTHY STATE  (B) AT THE START OF RESTRAINT  (C) LONG-TERM IMMOBILE STATE

ELECTRICAL STIMULATION DEVICE AND ELECTRICAL STIMULATION METHOD

TECHNICAL FIELD

The present invention relates to a technique for interactive coupling of muscle motions based on functional electrical stimulation (FES: Functional Electrical Stimulation) and electro myography (EMG: Electro MyoGraphy) through personalized models, thus providing the rehabilitation of patients with their body movements restrained due to muscle paralysis or orthopedic diseases, as well as for muscle training in the field of sports.

BACKGROUND ART

In recent years, research has been actively conducted to support movement and compensate for functions in patients with physical paralysis disabilities. In particular, functional electrical stimulation directly stimulates peripheral muscles, and is attracting attention as an applicable technique even for severe paralysis. In particular, many studies have been done on the task of trajectory tracking of joints by electrical stimulation of multiple muscles, but they still have a challenge in the derivation of an appropriate model to be incorporated into the controller, resulting from problems such that the intensity of electrical stimulation and changes in muscle strength and length have strong nonlinearity therebetween and an ill-posed problem (ill-posed problem) needs to be solved, caused by redundancy for motion control of the joints driven by at least one agonist-antagonist muscle pair.

To solve these problems, the inventors introduced the electrical agonist-antagonist muscle ratio (EAA ratio) $r_E$, expressed as the ratio of the electrical stimulation intensity between a pair of agonist-antagonist muscles, and the electrical agonist-antagonist muscle activity (EAA activity) $s_E$, expressed as the sum, based on the equilibrium-point hypothesis, which states that the central nervous system controls the equilibrium point and stiffness of the agonist-antagonist motion system separately, and showed that the equilibrium point and stiffness of the human knee joints can be controlled separately by $r_E$ and $s_E$, respectively, and that the performance can be modeled as a cascade-coupled dead time system and secondary delay system (Non Patent Literatures 1 and 2).

EM-701F2 (manufactured by Noraxon), which is currently used clinically, is a representative electromyographic biofeedback (EMG-BFB), and this converts the EMG of a single muscle into a diagram, graph, or sound to be transmitted to the patient. A FES system has also been proposed, which acquires weak EMG from a paralyzed limb in combination with the FES biofeedback and performs electrical stimulation according to its intensity (IVES (registered trademark) manufactured by OG Wellness). This enhances the voluntary motion of the paralyzed limb and promotes motor re-learning in the brain. KiNvis (manufactured by Inter Reha) also has been proposed, which is a rehabilitation device that uses kinesthetic illusion induced by visual stimulation and tactile stimulation to present images to the patient as if they were moving their paralyzed upper limb.

Patent Literatures 1-3 describe electrical stimulation devices that can switch between functional electrical stimulation and electromyography measurement to perform rehabilitation for patients with muscle paralysis of the extremities.

CITATION LIST

Patent Literature

Patent Literature 1: JP 2004-698 A
Patent Literature 2: JP 2016-525390 A
Patent Literature 3: JP 2018-507763 A Non Patent Literature Non Patent Literature 1: Kazuhiro Matsui, Yasuo Hishii, Kazuya Maegaki, Yuto Yamashita, Mitsunori Uemura, Hiroaki Hirai, and Fumio Miyazaki, Equilibrium-point control of human elbow-joint movement by using multichannel functional electrical stimulation-Validation under isometric environment-, Transactions of the Society of Instrument and Control Engineers Vol. 50, No. 11, 755/762 (2014)

Non Patent Literature 2: Kazuhiro Matsui, Kazuya Maegaki, Yuto Yamashita, Mitsunori Uemura, Hiroaki Hirai, and Fumio Miyazaki, Analysis of equilibrium-point control model using two-channel functional electrical stimulation (FES) to extend elbow joint movement to an unconstrained environment on the horizontal plane, Biomedical Engineering Vol. 53 No. 1 (February 2015)

SUMMARY OF INVENTION

Technical Problem

Among the conventional biofeedback (EMG-BFB) devices, EM-701F2 (manufactured by Noraxon) fails to provide feedback that translates the acquired EMG into "meaningful information," i.e., a motion that is expected from the EMG, to allow the patient to intuitively understand the information.

The aforementioned FES system IVES (registered trademark) enhances the voluntary motion of the paralyzed limb, thus promoting motor re-learning in the brain. This system, however, does not anticipate the motion realized by EMG to give appropriate stimulation, and thus may amplify compensatory behaviors that should be suppressed. Therefore, it is necessary to implement EMG-BFB that allows patients to learn how to change their own EMG to achieve the target motion. The problem here is the individual patient's motion model that predicts a motion from the EMG. Although many methods have been proposed to predict a motion from EMG, for appropriate feedback to the patients, it is necessary to reflect the current muscle characteristics of the patient on the model. If a patient with paralysis has a discrepancy between the voluntarily produced EMG and the residual muscle function (i.e., having sufficient muscle functions but insufficient EMG), it is difficult to obtain the residual muscle characteristics of the patient from the EMG associated with voluntary motion. This makes it difficult to establish a personalized motion model for each patient.

The KiNvis rehabilitation device, which uses kinesthetic illusion induced by visual stimulation and tactile stimulation, does not utilize personalized motion models. Patent Literatures 1-3 describe devices that rehabilitate patients with muscle paralysis through functional electrical stimulation and electromyography measurements. They, however, do not utilize personalized motion models, and have certain limitations for effective rehabilitation.

In view of the above, the present invention provides electrical stimulation device and method that enable effectively interactive functional electrical stimulation and electromyography-based motion to be performed selectively using a model of target muscle characteristics.

Solution to Problem

An electrical stimulation device according to the present invention includes at least one pair of positive and negative electrodes to be attached to epidermis of agonist-antagonist muscles acting on a target joint, a display unit that displays an image, a first rehabilitation unit that detects an electromyogram of the agonist-antagonist muscles via the electrodes and outputs variation information corresponding to the detected electromyogram to the display unit, a second rehabilitation unit that instructs motion of the agonist-antagonist muscles via the display unit and outputs a stimulation current signal corresponding to the instructed motion of the agonist-antagonist muscles to the electrodes, a model storage unit that stores models obtained beforehand and relating to target muscle characteristics, the models including: a first model with parameters for converting the detected electromyogram into the variation information, and a second model with parameters for converting information on the motion of the agonist-antagonist muscles into the stimulation current signal, and a control unit that selectively executes the first rehabilitation unit and the second rehabilitation unit.

An electrical stimulation method according to the present invention includes: a first rehabilitation step of detecting, via at least one pair of positive and negative electrodes to be attached to epidermis of agonist-antagonist muscles acting on a target joint, an electromyogram of the agonist-antagonist muscles and outputting variation information corresponding to the detected electromyogram to a display unit, a second rehabilitation step of instructing motion of the agonist-antagonist muscles via the display unit and outputting a stimulation current signal corresponding to the instructed motion of the agonist-antagonist muscles to the electrodes, and a control step of selectively executing the first rehabilitation step and the second rehabilitation step. The first rehabilitation step uses a first model that is obtained beforehand and relates to target muscle characteristics, the first model including parameters for converting the detected electromyogram into the variation information. The second rehabilitation step uses a second model that is obtained beforehand and relates to target muscle characteristics, the second model including parameters for converting information on the motion of the agonist-antagonist muscles into the stimulation current signal.

According to these aspects of the invention, target muscle characteristics are acquired in advance. The quantified models having parameters approximating these muscle characteristics are created, so that they can be applied interactively. This effectively implements brain motor re-learning for recovery and improvement in the subsequent rehabilitation and sports training.

Advantageous Effects of Invention

The present invention enables effective implementation for motor re-learning in the brain.

BRIEF DESCRIPTION OF DRAWINGS

FIG. 1A illustrates conversion of EMG into motion information through a model and display of the converted motion information on the screen; and FIG. 1B illustrates conversion of the motion instruction information obtained from the screen into electrical stimulation information through the (inverse) model, and how the screen displays the FES performed with the converted electrical stimulation information.

FIG. 4A is a schematic plan view for measuring muscle characteristics of the neuromuscular system; and FIG. 4B is a schematic plan view for measuring muscle characteristics of the musculoskeletal system.

FIG. 5A in normal health; FIG. 5B at the onset of stroke or other diseases; and FIG. 5C during long-term bed rest.

FIG. 6A and FIG. 6B illustrates an image of rehabilitation: FIG. 6A shows rehabilitation of the neural system; and FIG. 6B shows rehabilitation of the musculoskeletal system.

FIG. 12A in a healthy state; FIG. 12B at the start of restraint due to plaster slab immobilization, for example; and FIG. 12C in a long-term immobile state.

DESCRIPTION OF EMBODIMENTS

Figure 1A:
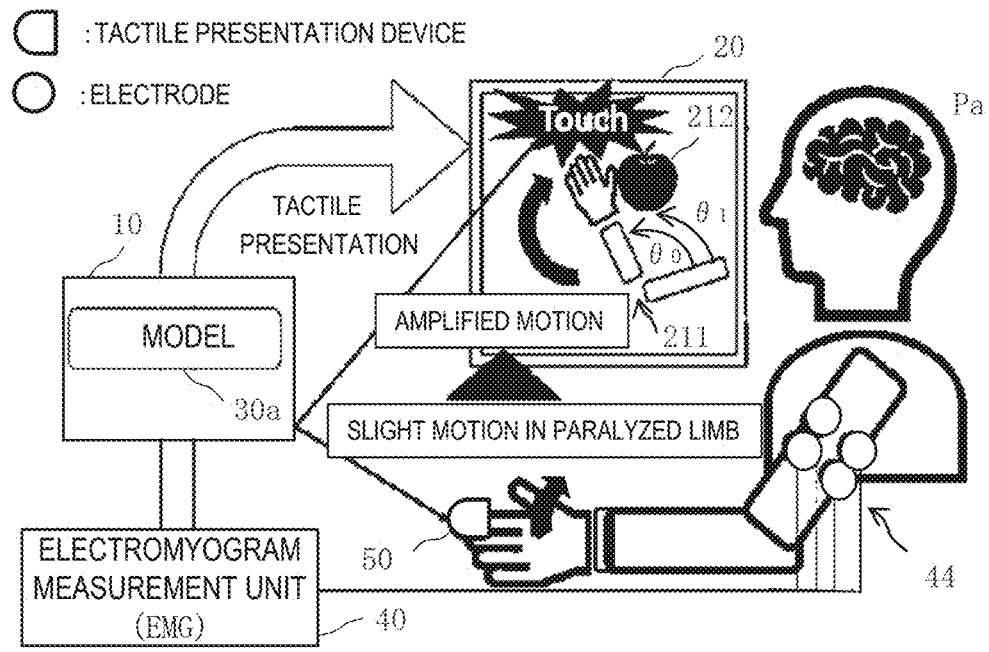
FIG. 1A and FIG. 1B explains an interactive application image when the electrical stimulation device according to the present invention is applied to rehabilitation.
Figure 1B:
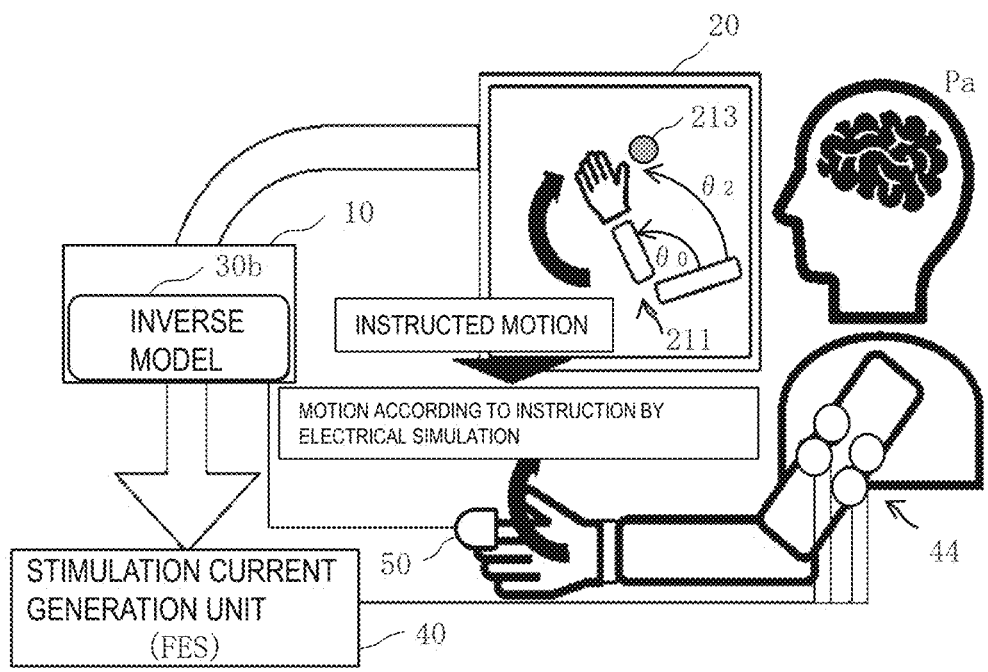
Figure 2:
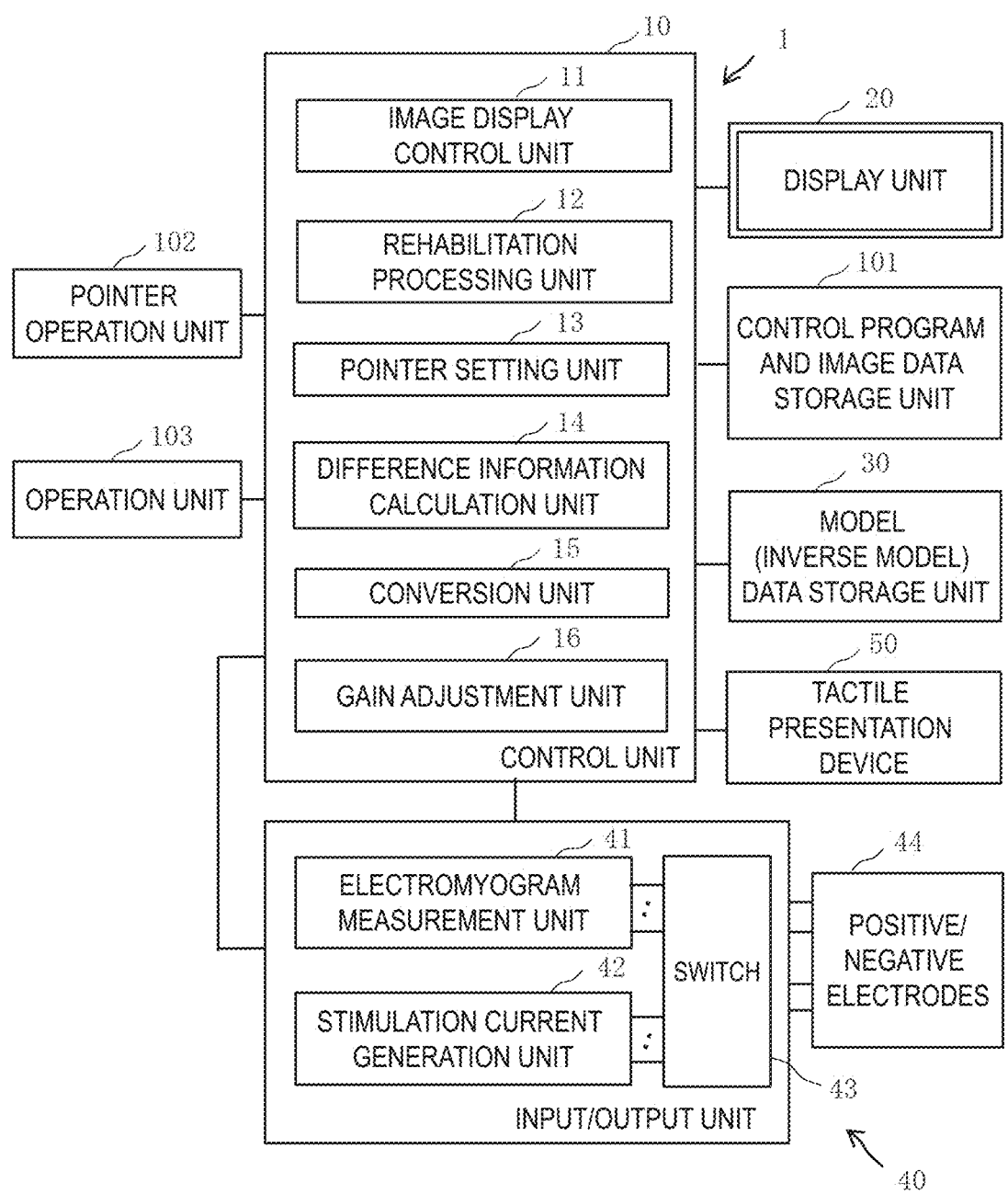
FIG. 2 shows a functional configuration of one embodiment of the electrical stimulation device according to the present invention.

FIG. 1A and FIG. 1B explains an interactive application image when the electrical stimulation device 1 according to the present invention is applied to rehabilitation: FIG. 1A illustrates conversion of EMG into motion information through a model and display of the converted motion information on the screen; and FIG. 1B illustrates conversion of the motion instruction information obtained from the screen into electrical stimulation information through the (inverse) model, and how the screen displays the FES performed with the converted electrical stimulation information. FIG. 2 shows a functional configuration of one embodiment of an electrical stimulation device 1.

The electrical stimulation device 1 includes a control unit 10 having a processor (CPU), a display unit 20 that displays an image and is connected to the control unit 10, a model (inverse model) data storage unit 30 described later, an input/output unit 40, and a tactile presentation device 50 that is used if needed. Also connected to the control unit 10 are a control program and image data storage unit 101, a pointer operation unit 102, and an operation unit 103. The control program and image data storage unit 101 stores a control program for controlling the operation of the electrical stimulation device 1, and data of various images displayed on the display unit 20. The control program and image data storage unit 101 has a memory area that holds various data necessary for the processing, and a work area for performing data processing.

The input/output unit 40 selectively performs EMG measurement and FES in response to a selection of the rehabilitation mode. The input/output unit 40 includes at least one pair of electrodes that are positive and negative electrodes, which is positive and negative electrodes 44 having two pairs of electrodes in this embodiment.

The display unit 20 displays at least an image of a body part corresponding to a rehabilitation part of a patient undergoing the rehabilitation, for example, an upper limb object 211 and an index object 212 for presentation. The image data of the upper limb object 211 and the index object 212 are once written to predetermined address coordinates of a display RAM (not shown), and then repeatedly are read out on the screen at frame intervals and displayed like a still image. For instance, the screen display example of FIG. 1A and FIG. 1B is a planar view screen from a first-person viewpoint, and displays a state in which the upper limb is rotating on a horizontal plane, with the elbow joint as the reference coordinate. For instance, the index object 212 may be an image simulating a fruit.

The model (inverse model) data storage unit 30 measures the muscle characteristics when the patient's muscles are in a healthy state, for example, at the onset of stroke (including before and after the onset), quantifies the characteristics as a model with personalized parameters, and stores it. For instance, the measured muscle characteristics are stored in a storage unit of a measurement unit (see FIG. 4A and FIG. 4B). Inclusion of the inverse model enables interactive execution of rehabilitation motions. Muscle characteristics are often paralyzed once at the onset of stroke, and the muscles weaken due to the paralysis. Then, muscle characteristics are measured for acquisition at an early stage after the stroke onset, which keeps the muscle characteristics that are substantially equal to those in healthy conditions. The early stage after the onset of stroke is preferably as early as possible, but may include a period of one or two weeks after the onset of stroke, for instance. Alternatively, the muscle characteristics can be obtained on a regular basis, as in health checkups, and these muscle characteristics may be used.

Figure 3:
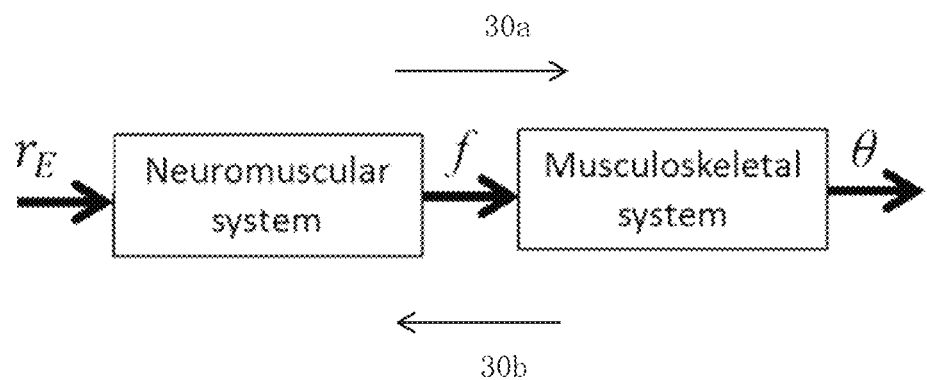
FIG. 3 is a diagram modeling the input-output relationship of coupling a neuromuscular system model and a musculoskeletal system model.

FIG. 3 is a diagram modeling the relationship of coupling a neuromuscular system (Neuromuscular system) model and a musculoskeletal system (Musculoskeletal system) model. As shown in FIGS. 1A and 1B and FIG. 3, the model 30a in the present embodiment converts the agonist-antagonist muscle ratio $r_E$ corresponding to the voltage detected at the EMG into a force f, and further converts the force f into an angle θ around the elbow joint for outputting. In the present embodiment, the inverse model 30b, which is an inverse system of the model 30a, converts the instructed angle θ around the elbow joint into a force f, further converts the force f into an agonist-antagonist muscle ratio $r_E$, and outputs it as a stimulation current value for each electrode in the electrodes 44. The details of the measurement of muscle characteristics are described later, referring to FIG. 4A and FIG. 4B.

Referring next to FIG. 1A and FIG. 1B, the image of rehabilitation is explained. This example assumes the case where the patient has an upper limb paralyzed due to stroke. For rehabilitation, the positive electrode of the electrodes 44 is attached to the epidermis along the biceps, and the negative electrode is attached to the epidermis along the triceps. The biceps is a voluntary flexor and the triceps is a voluntary extensor.

Assume here that the address coordinates of the objects 211 and 212 are defined in the local coordinate system on the screen. In one example, let that the elbow joint of the upper limb object 211 is the origin, and the arm of the upper limb is the reference axis. Then, these objects are represented as the angle θ0 of the hand of the upper limb object 211 and the angle θ1 of the index object 212.

In mode (A) of the rehabilitation by the electrical stimulation device 1, the patient is asked to, while looking at the screen, voluntarily have a conscious of turning their own upper limb until the upper limb object 211 touches the index object 212 at an angle θ1 that is slightly away. In response to this voluntary consciousness, the upper limb itself rotates slightly via the paralyzed nerve, and the input/output unit 40 acquires weak EMG via the electrodes 44. The detected voltage, which is the EMG, is converted by the model 30a, and changes from angle θ0 to angle θ1. In this way, the hand part rotates in a direction overlapping the index object 212 due to the rotation of the upper limb object 211 around the elbow joint.

At this time, the EMG is weak due to nerve paralysis at the beginning of rehabilitation, and in many cases the upper limb object 211 on the screen fails to reach the position of the index object 212. In this case, the output of model 30a is amplified in the rotation angle θ while adjusting the gain, thereby bringing the upper limb object 211 closer to the display coordinate position of the indicator object 212 at angle θ1. This adjustment of the gain gives the patient a successful experience that the upper limb was voluntarily turning to the vicinity of the index object 212, which contributes to the improvement of the therapeutic effect. It is expected that as the neuromuscular system recovers, the gain set at the beginning of rehabilitation will be gradually or stepwise lowered until eventually the upper limb object 211 reaches the display coordinate position (angle θ1) of the index object 212 without any gain.

Regardless of the presence or not of gain amplification, if the hand portion of the upper limb object 211 reaches the display coordinate position of the index object 212 and it is confirmed that the display coordinates match (the images overlap), the tactile presentation device 50 fitted around the patient's finger operates when they match or while they match to output a tactile presentation signal, thus giving the finger a tactile sensation as if they touched the fruit of the index object 212. Specifically, this tactile presentation can be applied using stimulation by mechanical deformation, stimulation by applying pressure, or electrical stimulation. In the rehabilitation mode of (A), it is preferable to prevent the patient from seeing the movement of the affected upper limb.

Next, in mode (B) of the rehabilitation by the electrical stimulation device 1, the patient is asked to, while looking at the screen, observe the movement of the upper limb, in which the upper limb object 211 follows the index object 213 whose display position is changed. It is assumed that the change of the display position of the index object 213 is instructed automatically, by a medical profession, or by the upper limb on the patient's normal side. The control unit 10 (see FIG. 1A and FIG. 1B) performs control to change the display coordinates so that the upper limb object 211 gradually approaches the index object 213. As in FIG. 1A, the hand of the upper limb object 211 is represented as angle θ0 and the index object 213 as angle θ2.

First, the angles θ0 and θ2 are continuously measured, and the angle θ0 is taken into the inverse model 30b. The inverse model 30b converts the angle θ0 to a force f, converts the force f to an agonist-antagonist muscle ratio $r_E$, and converts it into a stimulus current value that satisfies this ratio. Then, the generated stimulation current is output from the input/output unit 40 as FES and supplied to the electrodes 44. When rehabilitation is continued without being confined to bed for long periods, muscle contraction is excited by electrical stimulation through the inverse model 30b, in which the motion instruction from angle θ0 to angle θ2 is personalized, and the patient can experience the motion as instructed. Such an experience contributes to recovery, and more effective recovery is expected.

Referring back to FIG. 2, the pointer operation unit 102 and operation unit 103 are operable from the outside, which may include a mouse or a touch panel with a light-transmissive pressure sensitive sheet stacked on the screen of the display unit 20, for example. The pointer operation unit 102 moves the index object 213 of a circular image, for example, to any coordinate position on the screen. The moving direction of the index object 213 may enable at least the movement in the direction of the angle θ. The operation unit 103 performs mode instructions, gain settings, and other various instructions, and may include a keyboard or a touch panel.

The input/output unit 40 includes an electromyogram measurement unit 41, a stimulation current generation unit 42, a switch 43, and the positive and negative electrodes 44. The electromyogram measurement unit 41 periodically detects voltages generated by the positive and negative electrodes 44 and leads them to the control unit 10. The stimulation current generation unit 42 generates a current having a stimulation current value periodically instructed to be output from the control unit 10 and outputs the generated current to the positive and negative electrodes 44.

The control unit 10 executes a control program stored in the control program and image data storage unit 101, thus functioning as an image display control unit 11, a rehabilitation processing unit 12, a pointer setting unit 13, a difference information calculation unit 14, a conversion unit 15, and a gain adjustment unit 16.

The image display control unit 11 reads necessary image data from the control program and image data storage unit 101 and displays it on the display unit 20 at the instructed coordinate position. Examples of image data include the upper limb object 211 that simulates an upper limb part, and index objects 212 and 213, as shown in FIG. 1A and FIG. 1B. These objects are displayed under a predetermined coordinates system as stated above, and are changed in position and shape according to external information. The upper limb object 211 is controlled to move according to the measured EMG and by the instructed FES. The index object 213 moves by an instruction that is an external operation, for example, and the index object 212 stays or moves by an instruction that is an external operation, for example.

Receiving an operation from the operation unit 103, the rehabilitation processing unit 12 selectively executes a rehabilitation mode based on EMG measurement and a rehabilitation mode with FES. In the rehabilitation mode with FES, the rehabilitation processing unit 12 executes the process of gradually bringing the upper limb object 211 closer to the index object 213. For instance, the rehabilitation processing unit 12 executes a process of moving the upper limb object 211 from the angle θ0 toward the index object 213 at angle θ2 with a predetermined speed.

In the rehabilitation mode with FES, the pointer setting unit 13 accepts an operation instruction from the pointer operation unit 102 and moves the index object 213 to any position in the screen.

In the rehabilitation mode based on EMG measurement, the difference information calculation unit 14 calculates a difference in position under the display coordinate system between the image of the hand portion of the upper limb object 211 and the index object 212. In the rehabilitation mode with FES, the difference information calculation unit 14 calculates a difference in position under the display coordinate system between the image of the hand portion of the upper limb object 211 and the index object 213. In the above, the difference information calculation unit 14 determines that the two objects are in contact with each other when the difference is zero or less than or equal to a predetermined value (within a predetermined distance), and outputs a tactile presentation instruction signal to the tactile presentation device 50.

In the rehabilitation mode based on EMG measurement, the gain adjustment unit 16 accepts an instruction from the operation unit 103 and adjusts the gain for amplifying the output signal from the model 30a.

The conversion unit 15 forward-converts input data into output data by the model 30a, and the conversion unit 15 inverse-converts input data into output data by the inverse model 30b. The conversion unit 15 also amplifies the output signal at or from the model 30a according to the adjusted gain.

Referring next to FIG. 3, the following explains creation of a model that defines muscle characteristics unique to humans. A model is created at an early stage after the onset of paralysis of the neural system, such as stroke. This is because in this condition, the patient's muscle characteristics are considered to be at almost the same level as in normal health. The muscle characteristics acquired at this time have significance as target muscle characteristics until the muscles are restored to its original healthy state through the subsequent rehabilitation.

Figure 4A:
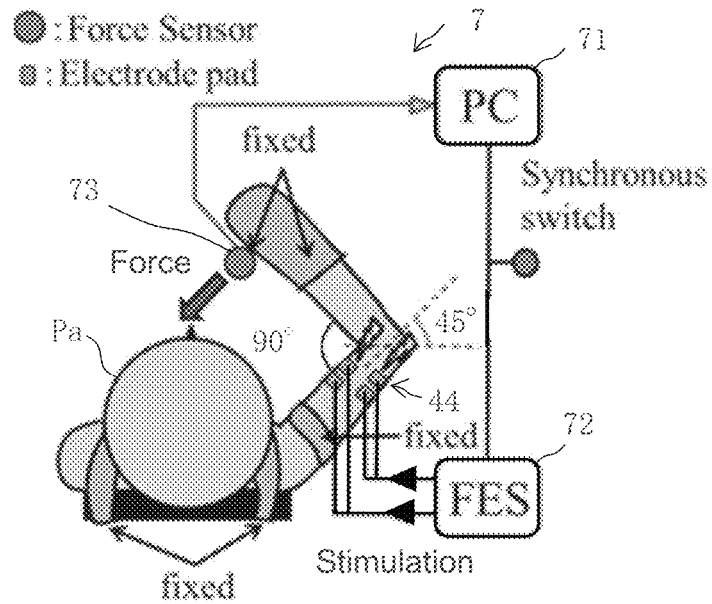
FIG. 4A and FIG. 4B shows a configuration example of a measurement unit that measures and models muscle characteristics.
Figure 4B:
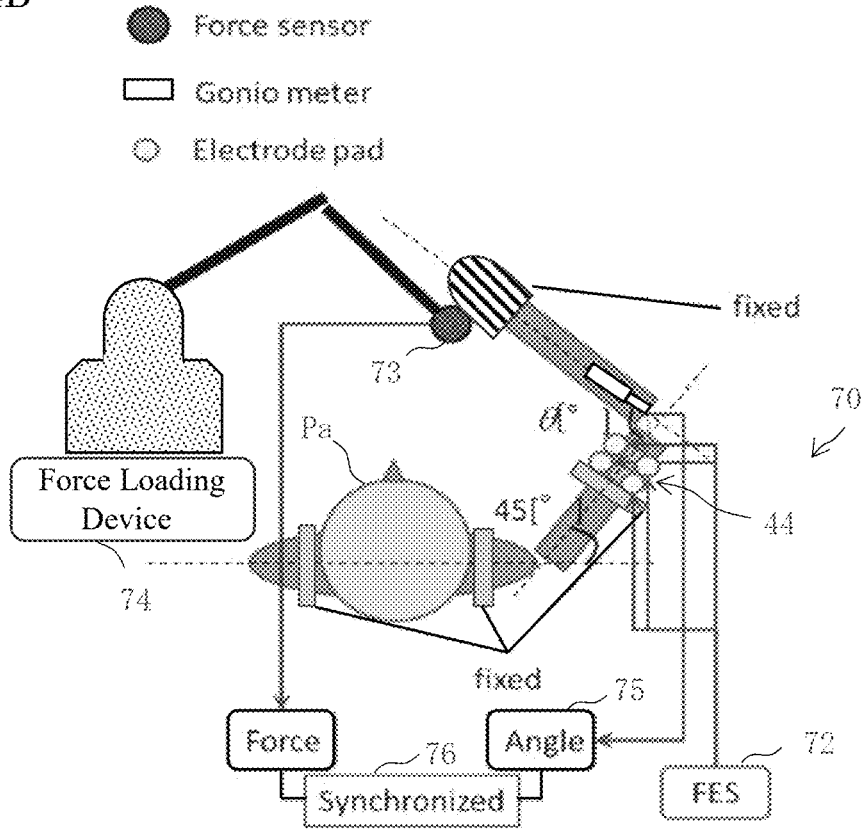

FIG. 4A and FIG. 4B shows a configuration example of a measurement unit that measures and models muscle characteristics: FIG. 4A is a schematic plan view for measuring muscle characteristics of the neuromuscular system; and FIG. 4B is a schematic plan view for measuring muscle characteristics of the musculoskeletal system. In this embodiment, the secondary system transfer function as shown in Equations (1) and (2) is used as the model of the input/output relationship. Equation (1) is a transfer function describing input/output characteristics related to the neural system, and Equation (2) is a transfer function describing input/output characteristics related to the musculoskeletal system. As described in FIG. 3, the overall control model is constructed by combining Equations (1) and (2).

[Mathematical 1]

$$G(s) = K \cdot \frac{\omega_n^2}{s^2 + 2\zeta\omega_n s + \omega_n^2} \cdot e^{-\tau s} \quad (1)$$

where K is the constant, $\omega_n$ denotes the natural angular frequency, τ denotes dead time, and ζ denotes a damping ratio.

The parameters of the constant (gain) K, the natural angular frequency $\omega_n$, the damping ratio $\zeta$, and the dead time $\tau$ differ from person to person. These differences are thought to be intricately related to the factors such as the degree of muscle development by the individual and the ratio of slow- and fast-twitch muscle fibers. The modeling method, however, is simple and convenient, and optimal parameters can be easily obtained for individuals with these differences. The dead time $\tau$ models the phase delay that cannot be represented by the secondary delay system.

[Mathematical 2]

$$G(s)_B = K \cdot \frac{\omega_n^2}{s^2 + 2\zeta\omega_n s + \omega_n^2} \quad (2)$$

As shown in Equation (2), the dead time $\tau$ in the musculoskeletal system is 0, and agrees well with the actual measurement, so the dead time $\tau$ is estimated to be 0.

In FIG. 4A, the measuring device 7 measures the muscle characteristics of the neuromuscular system, and gives electrical stimulation to the target agonist-antagonist muscles of the patient Pa. In this example, the positive and negative electrodes 44 are applied over the biceps and triceps, which are the agonist-antagonist muscles. The hand portion is preferably restrained. A force sensor 73, such as a capacitive six-axis force sensor, is placed in contact with this hand portion to measure the force (the hand force) generated during electrical stimulation, to measure the force (force) in an isometric environment. The electrical stimulation signal from the FES 72 is generated according to a command from the personal computer 71 for information processing, as described below. The output of the force sensor 73 when the electrical stimulation signal is applied to the positive and negative electrodes 44 is imported into the personal computer 71. In the isometric environment, it is preferable to maintain a 45-degree angle between the body surface and the upper arm, and a 90-degree elbow angle.

In FIG. 4B, the measuring device 70 measures the muscle characteristics of the musculoskeletal system, and gives electrical stimulation to the target agonist-antagonist muscles of the patient Pa, as described later. In this example, the positive and negative electrodes 44 are applied over the biceps and triceps, which are the agonist-antagonist muscles. The hand portion is not restrained. The force from an external-force loading device 74 is applied from the tip of the robot arm to the hand. A force sensor 73 is attached to the tip of the robot arm. An angle sensor 75 such as a goniometer for measuring the elbow joint angle is attached to the elbow. A synchronizing unit 76 is for synchronously acquiring the angle measurement and the force measurement.

Next, the method of obtaining muscle characteristics is explained. The following several patterns ((1) to (4), and others) can be used for acquiring muscle characteristics, and the output is measured for each pattern. In the following description, the electrical agonist-antagonist muscle ratio and the electrical agonist-antagonist muscle sum, which are the basis of current signal generation, are expressed as $r_E$, and $s_E$, respectively.

(1) Pattern that obtains muscle characteristics by inputting sweep waveforms (chirp waves) to the neuromuscular system and musculoskeletal system separately:
(a) for acquisition of the characteristics of the neuromuscular system, the hand is fixed to the sensor 73, and constant $s_E$ and $r_E$ of the sweep waveform are input, and the output is a force, which is performed with multiple $s_E$; and
(b) for acquisition of musculoskeletal system characteristics, while performing electrical stimulation with a constant $s_E$, an external force using the robot arm, for example, is input as a sweep wave, and the output is an angle, which is performed with multiple $s_E$.

(2) Pattern that obtains muscle characteristics by inputting perturbations (rectangular waves of short duration) to the neuromuscular system and musculoskeletal system separately:
(a) for acquisition of the characteristics of the neuromuscular system, the hand is fixed to the sensor 73, and constant $s_E$ and $r_E$ of perturbations are input, and the output is a force, which is performed with multiple $s_E$; and
(b) for acquisition of musculoskeletal system characteristics, while performing electrical stimulation with a constant $s_E$, an external force using the robot arm, for example, is input as perturbations, and the output is an angle, which is performed with multiple $r_E$.

(3) Pattern that obtains characteristics of the neuromuscular system and musculoskeletal system collectively by inputting sweep waveforms (chirp waves):
(a) the hand is not fixed, and constant $s_E$ and $r_E$ of the sweep waveform are input, and the output is an angle, which is performed with multiple $s_E$.

(4) Pattern that obtains characteristics of the neuromuscular system and musculoskeletal system collectively by inputting perturbations (rectangular waves of short duration):
(a) the hand is not fixed, and constant $s_E$ and $r_E$ of perturbations are input, and the output is an angle, which is performed with multiple $s_E$.

As for the above (1) and (2), application patterns are conceivable, such as combining them or finding a relational expression so that only one measurement suffices. For instance, in Example 1, a pattern is conceivable, in which a sweep waveform is used for the neuromuscular system and a perturbation pattern is used for the musculoskeletal system. In Example 2, another pattern may be used, in which the musculoskeletal system characteristics may be acquired by perturbation. For the neuromuscular system, the relationship with the musculoskeletal system characteristics may be examined in advance, and the characteristics of the neuromuscular system may be obtained from the acquired musculoskeletal system characteristics.

The measurement results obtained as described above may be applied to Equations (1) and (2), thus specifying the parameters including the gain K of the transfer function, the natural angular frequency $\omega_n$, the damping ratio $\zeta$, and the dead time $\tau$ to obtain a model of patient-specific muscle characteristics. An inverse model also is created from these model parameters, so that it can be applied interactively in which the input and output directions are reversed. Each parameter data of the created model and inverse model are stored in the model (inverse model) data storage unit 30. Alternatively, they may be stored in a server (not shown) in association with the IDs, and read out to the model (inverse model) data storage unit 30 via a network for later rehabilitation.

Figure 5A:
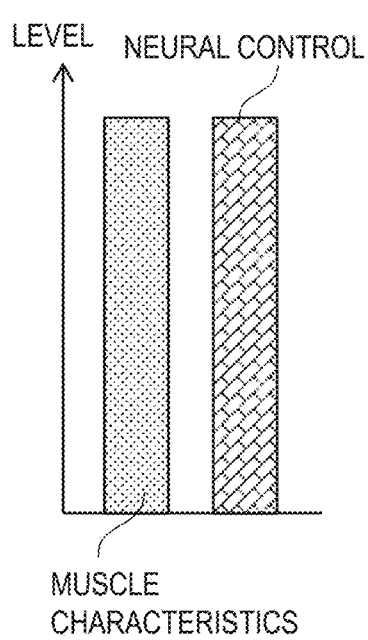
FIG. 5A to FIG. 5C illustrates the general temporal changes in human muscle characteristics and level of neural control over time.
Figure 5B:
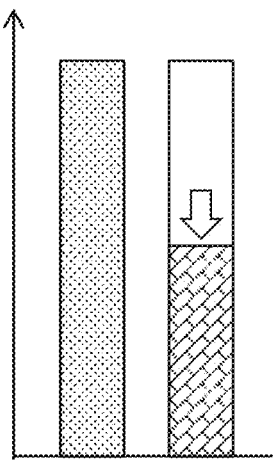
Figure 5C:
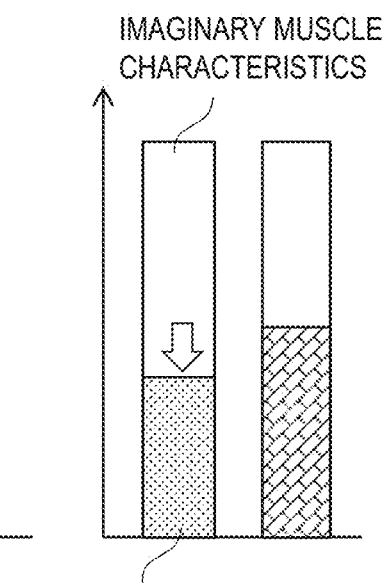

Next, FIG. 5A to FIG. 5C illustrates the general temporal changes in human muscle characteristics and level of neural control over time: FIG. 5A in the healthy state, FIG. 5B at the onset of stroke or other diseases, and FIG. 5C during long-term lying in bed. FIG. 6A and FIG. 6B illustrates an image of rehabilitation: FIG. 6A shows rehabilitation of the neural system; and FIG. 6B shows rehabilitation of the musculoskeletal system.

FIG. 5A represents the levels of muscle characteristics and neural control in a healthy state of an individual. FIG. 5B shows that when the individual develops a stroke at a certain point in time, for example, the patient's muscle characteristics immediately after the onset are assumed to be the same as those in a healthy state. Thus, the muscle characteristics at this time are measured for recording. The muscle characteristics recorded at this time serve as muscle characteristics as a target for recovery or reacquisition for the patient. The level of neural control decreases due to paralysis or the like caused by nerve damage. FIG. 5C shows that when the patient is in long-term bed rest without rehabilitation, for example, the muscles weakens due to disuse and the muscle characteristics decrease. The decreased portion is referred to as imaginary muscle characteristics.

FIG. 6A shows a rehabilitation process for recovering the neural control system instead of muscle characteristics rehabilitation. FIG. 6B shows a rehabilitation process for recovering the muscle characteristics, specifically the rehabilitation of the musculoskeletal system, instead of neural control. As shown in FIG. 5B, the muscle characteristics are stored at an early stage after the onset, and the degree of neural control in rehabilitation is checked or the parameters of the created model are referred to. This enables rehabilitation of the musculoskeletal system and the neural control system separately, as shown in FIG. 6A and FIG. 6B, so that both can be restored in a well-balanced manner. For instance, the parameters of one of the models 30a and 30b can be output and displayed on the screen by the image display control unit 11 (or output to a printer, etc.) via an instruction from the operation unit 103, and rehabilitation for the target muscle can be performed while referring to the output parameters. Conventional rehabilitation is performed for both muscles and nerves together, which may lose the recovery balance. This process enables appropriate rehabilitation of muscles and nerves separately while referring to the parameters of the created models.

That is, for the musculoskeletal system, the muscle characteristics at the onset of disease are parameterized for a model, and these parameters can be used as an indicator of musculoskeletal recovery, allowing for more precise muscle training.

Specifically, among the parameters of the model, if $\omega_n$ is high, the stiffness is considered high (i.e., the muscles are stiff), and thus muscle training to loosen up the stiffness is preferred. Muscle training is also preferable for spasticity (spas-tic-i-ty), a movement disorder seen as an aftereffect of stroke. The damping ratio $\zeta$ indicates the viscosity, and an approach for changing the viscosity, such as massage, is conceivable. If the dead time $\tau$, that is, the reaction speed is large, it is thought that muscle training can reduce the dead time, that is, improve the reaction speed.

Figure 7:
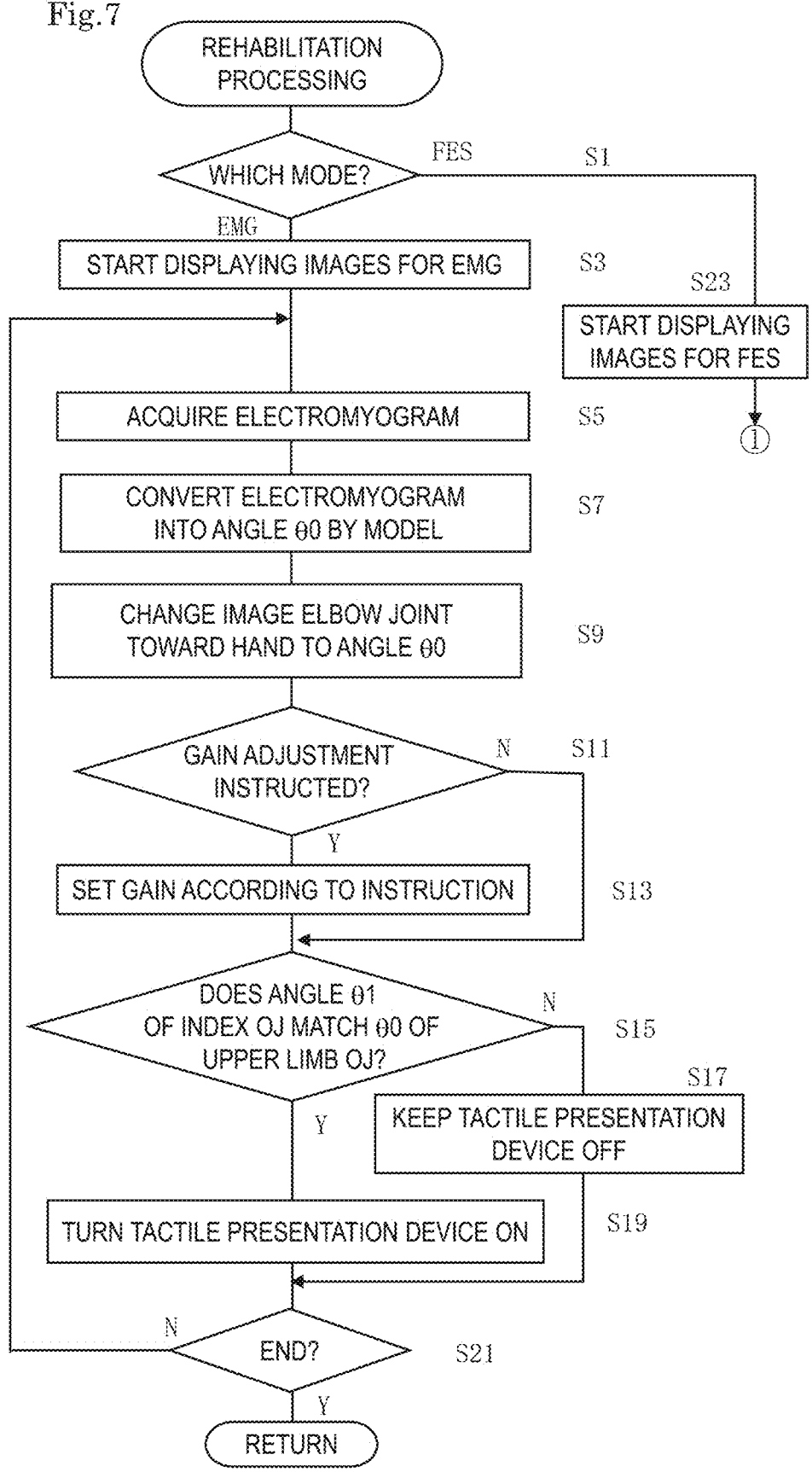
FIG. 7 is a flowchart showing an example of the rehabilitation process.
Figure 8:
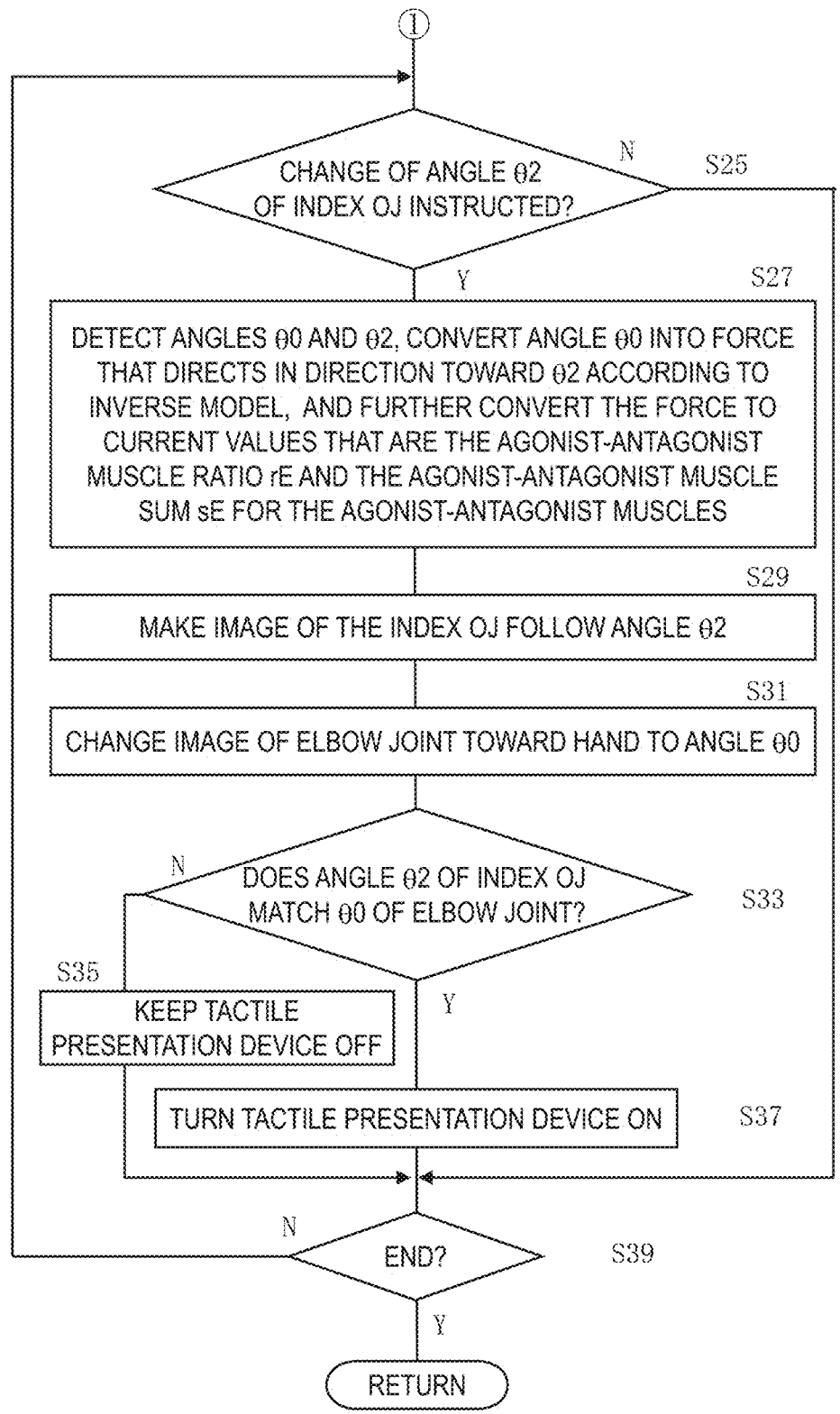
FIG. 8 is a flowchart showing an example of the rehabilitation process.

FIGS. 7 and 8 show a flowchart of an example of the rehabilitation process of the neural control system.

This flowchart may be repeatedly executed at a predetermined cycle. First, the rehabilitation mode is confirmed (step S1). If the rehabilitation mode is FES, the process goes to step S23. If it is EMG, the process goes to step S3. The rehabilitation mode can be selected as appropriate, and thus rehabilitation can be performed in accordance with the recovery status.

In step S3, the process starts display of the upper limb object 211 and index object 212, which are images for EMG, on the display unit 20. Next, an electromyogram acquisition step is executed (step S5), and the voltage information of the acquired electromyogram is converted into angle $\theta 0$ information by the model 30a (step S7). Then, the image of the hand of the upper limb object 211 on the screen is changed to the angle $\theta 0$ (step S9).

Subsequently, the process determines whether or not a gain adjustment is instructed (step S11), and if a gain adjustment is instructed, the gain adjustment unit 16 sets the gain according to the instruction in the model 30a (step S13). Setting the gain amplifies the conversion output value in the model 30a by the amount of gain for outputting. For instance, the patient can rotate the upper limb object 211 slightly due to nerve paralysis during voluntary movement of the paralyzed limb and thus the upper limb object 211 does not approach the index object 212. In this case, the degree of paralysis can be recognized from the amount of rotation. The amount of rotation and the difference between the objects 211, 212 are calculated by the difference information calculation unit 14.

Also, when an instruction is such that the gain is greater than 1, the upper limb object 211 comes closer to the index object 212. In this state, the patient is allowed to have a successful experience of gradually recovering the movement of their upper limb. In this state, if the upper limb object 211 does not reach the display position of the index object 212 (No in step S15), the tactile presentation device 50 remains off (step S17).

When the gain is further increased or the patient recovers in paralysis to a sufficient level, the upper limb object 211 will reach the display position of the index object 212 (Yes in step S15), and the tactile presentation device 50 turns on (step S19).

Next, the process determines whether to end the rehabilitation (step S21), and if so, the process returns this flow. Otherwise, the process goes back to step S5, to repeat the electromyogram acquisition process in the next cycle (e.g., dozen to a few dozens Hz).

If the rehabilitation mode is FES in step S1, the process starts display of the upper limb object 211 and index object 213, which are images for FES, on the display unit 20 in step S23. Next, going to FIG. 8, the process determines whether or not there is an instruction to change the display position of the index object 213, that is, to change the angle $\theta 2$ (step S25). If such a change is not instructed, the process goes to step S39.

If the change is instructed, the process detects the angles $\theta 0$ and $\theta 2$, converts the angle $\theta 0$ into a force that directs the angle $\theta 2$ according to the inverse model 30b, and further converts the force to current values that are the agonist-antagonist muscle ratio $r_E$ and the agonist-antagonist muscle sum $s_E$ for the agonist-antagonist muscles (step S27). Next, the process performs movement processing so that the image of the index object 213 follows the angle $\theta 2$ (step S29), and changes the image of the elbow joint toward the hand to the angle $\theta 0$ (step S31).

Next, the process determines whether the angle of the hand of the elbow joint has reached (matched) the angle $\theta 2$ of the index object 213 (step S33). If the upper limb object 211 has not reached the display position of the index object 213 (No in step S33), the tactile presentation device 50 remains off (step S35). If the upper limb object 211 has reached the display position of the index object 213 (Yes in step S33), the tactile presentation device 50 turns on (step S37).

Next, the process determines whether to end the rehabilitation (step S39), and if so, the process returns this flow.

Otherwise, the process goes back to step S25, to repeat the FES acquisition process in the next cycle (e.g., dozen to a few dozens Hz).

According to this process, a stimulus current is generated and applied to the positive and negative electrodes 44 so that the upper limb object 211 follows the index object 213 that changes its position, and the situation is displayed on the screen, so that the user is allowed to recognize that the musculoskeletal system moves normally.

Figure 9:
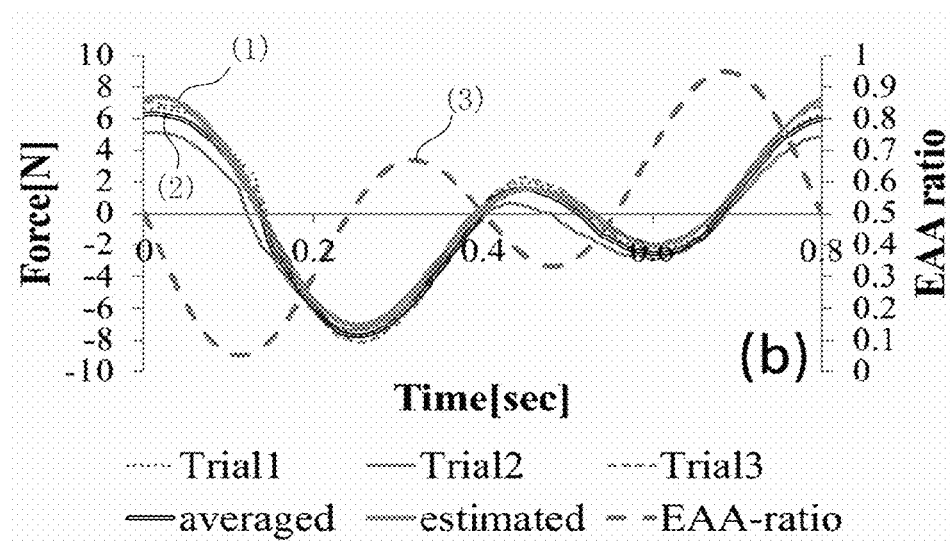
FIG. 9 is a chart showing an example of the input waveform and the measurements and estimated values of hand force.

The following describes the effectiveness of the model. FIG. 9 is a chart showing the calculated (estimated) and measured (in this example, the average of three trials) values of the hand force f by the neuromuscular model of the knee joint system modeled in Equation (1), as described in Non Patent Literature 1. The relationship of the parameters in Equation (1) is K=11.22, $\omega_n^2$=420.25, $2\zeta\omega_n$=41, and $\tau$=−0.05.

In FIG. 9, the estimated value of the hand force f obtained through the model having the parameters is indicated by (1), and the measured value of the hand force f is indicated by (2). The input waveform is indicated by (3). Waveforms (1) and (2) are almost identical, and this shows the effectiveness of the model.

Figure 10:
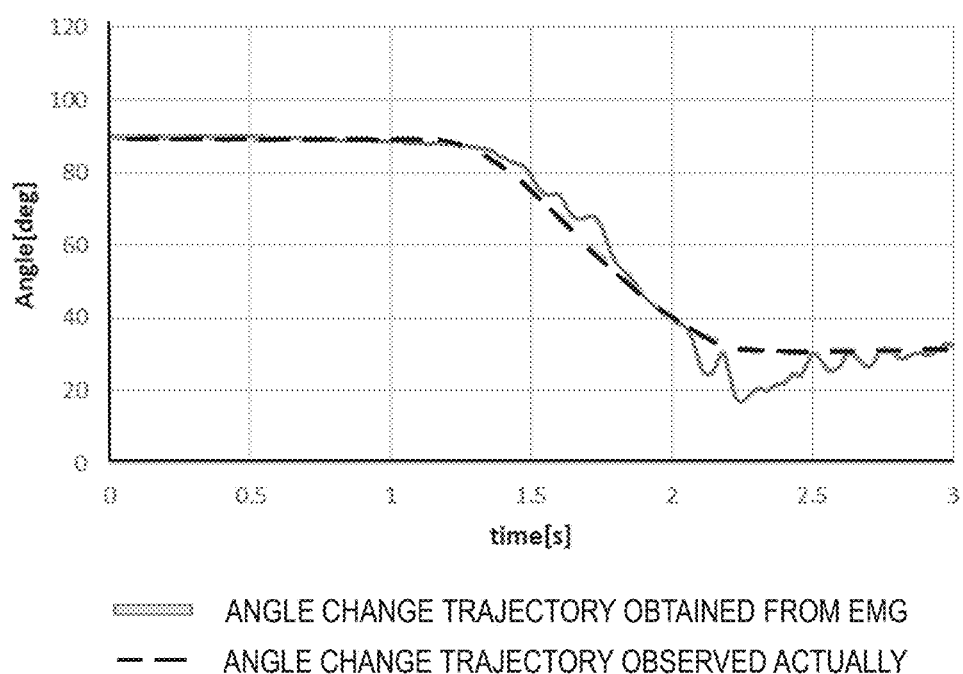
FIG. 10 is a chart showing an example of the relationship between the angular position of the elbow and EMG.

FIG. 10 is a chart showing the relationship between the angular position of the elbow and EMG. FIG. 10 plots the actual angle change trajectory (indicated by the dashed line in the figure) when a healthy subject performs the motion "elbow extension at a certain speed", and the angle change trajectory obtained by inputting the EMG into the constructed model (indicated by the solid line in the figure) on the same graph. This chart shows that the constructed model was able to reproduce not only the amount of change but also the speed of angular change (trajectory-tracking performance, i.e., smoothness) from the input EMG.

The present invention may also include the following modifications.

(1) The present embodiment described above shows an example using the models of the neuromuscular system and the musculoskeletal system. It is also possible to combine both models and use it as a model of the total system. In the models shown in FIG. 3, the neuromuscular system receives $r_E$ and $s_E$ of the coordinated FES as input. This system outputs, for example, the hand force, which is the difference between the contractile forces of the flexor and extensor muscles via a neural system that transmits electrical excitation triggered by electrical stimulation and a muscle system that exerts tension through contraction. The musculoskeletal system receives the finger force as an input, and outputs a joint angle via the passive characteristics of muscles and the dynamics of the skeletal system. The models based on FIG. 3 is conceivable as a cascaded coupling of these two systems. For such a model, identification and control experiments have been reported so far for elbow joint/ankle joint movements (Non Patent Literature 2). For a study targeting finger joints, the neuromuscular system responsible for fingertip-force control has been identified so far, and it has been reported that it can be approximated by a transfer function of secondary lag+dead time (Atsumi, Nagai, Taniguchi, Matsui, Nishikawa: Test of human finger-joint movement model using functional electrical stimulation based on equilibrium point hypothesis under an isometric condition, Biomedical Engineering, 56-5, 198/208 (2018)).

The following describes the applicability of the model to the neuromuscular+musculoskeletal system (hereafter referred to as total system) for angular control of the finger joints. For example, considering an example of application to the metacarpo phalangeal joint (MP joint: MetacarpoPhalangeal), the total system model can have a simple configuration because the measurement unit for muscle characteristics is identical to FIG. 4B, except that the sensor 73 and external force loading device 74 are no longer needed.

The identification experiment of the neuromuscular system was performed based on the above-mentioned "report by Atsumi et al.". That is, for the total system model, the input is $r_E$ and $s_E$, the output is the MP joint angle, and the frequency response of the system is derived to estimate the transfer function. For the transfer function, the approximation Equation (1) using secondary delay+dead time was applied.

To realize the purpose of simplicity of control, it is desirable that the order of the system is as low as possible, and that the behavior in the high frequency region is not considered important when slow finger movements are assumed. For the transfer function obtained in the experiment, the sum of two types of sine waves f1 and f2 was input as $r_E$ in order to clarify the reproducibility of the output and the validity of the frequency characteristic of the output through the evaluation experiment, where f1=5.0 Hz and three types of f2=0.5, 1.0, and 2.0 Hz. The results showed that it is reasonable to approximate with a transfer function of secondary delay+dead time.

Figure 11:
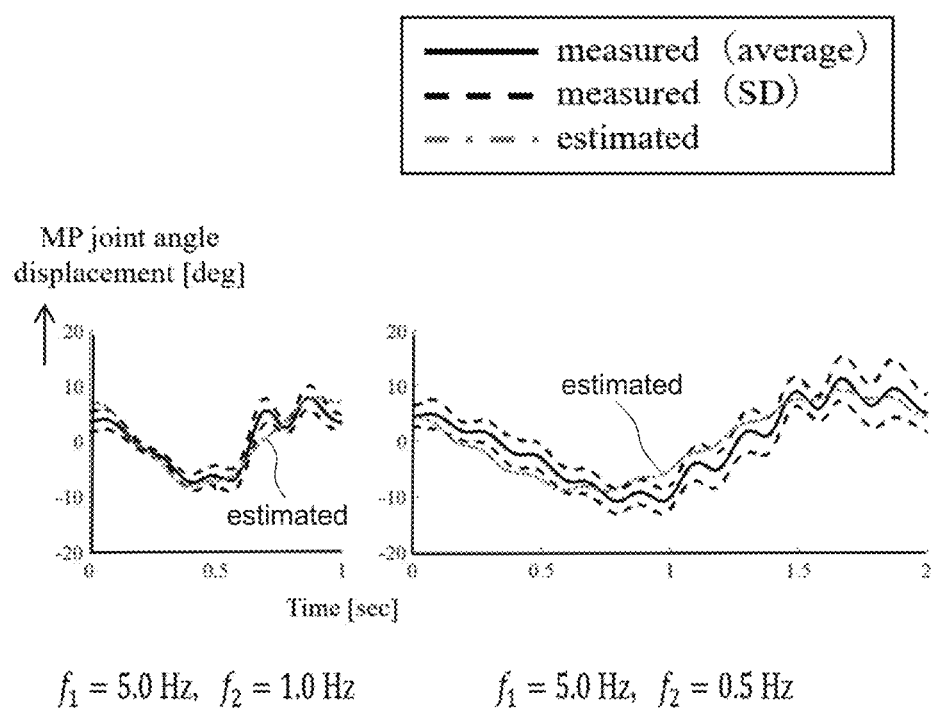
FIG. 11 is a chart showing an example of measured and estimated values in the time direction of the MP joint when the model is approximated by a single transfer function.

FIG. 11 shows the case of a model generated with one transfer function, in which the actual measurement is shown with a solid line and the standard deviation with a dashed line, and the estimated derived value based on the identification results of the transfer function for each subject is shown as a thin dashed-dotted line. According to this experiment, the standard deviation was small enough to be considered reproducible between trials of each subject. A system with a low natural angular frequency works better in a total system, and thus this approximation method that focuses on the low-frequency region is effective. The obtained model is able to simplify and describe the system, which originally has multiple systems coupled, with a single transfer function while maintaining the required reproducibility. Therefore, it can be considered that the result obtained will help simplify the control.

(2) The models can be applied to body parts other than elbow joints, such as finger joints and ankle joints, which are moved by agonist-antagonist muscles.

(3) The means for approximating the model is not only the transfer function but also the equation of motion as shown in Equation (3).

[Mathematical 3]

$$I\ddot{\theta}' + D\dot{\theta}' + K\theta' = T \tag{3}$$

where I denotes the inertia moment of an arm, D denotes the viscosity, K denotes the stiffness, and T denotes the torque.

(4) For model parameters, the function (transfer function, equation of motion, etc.) and coefficient parameters for the conversion may be recorded, and the converted values may be calculated by performing sequential calculations, or the calculation results may be recorded in advance in a LUT or the like, and the recorded values may be sequentially read out from the LUT.

(5) The model (inverse model) data storage unit 30 may also store the transfer function and the determination equations for the parameters. In EMG rehabilitation, it is difficult for humans to voluntarily maintain a constant state such as activity level a=1.0. The parameters therefore are determined using the activity $s_E$, which is input at the same time as the agonist-antagonist ratio $r_E$, as a variable. That is, the transfer function is adjusted according to the time-varying activity $s_E$ and the output is calculated for each input. For FES rehabilitation, an inverse model of the transfer function is used. At this time, a fixed input such as activation $s_E=1.0$ may be used. When trying to reproduce healthier motions, variable activity $s_E$ will improve the treatment effect, as in the case of EMG rehabilitation. It is preferable for the therapist to determine the change pattern of this activity $s_E$ based on the past knowledge.

(6) The index object 212 and index object 213 are described as separate objects in terms of their applications in this embodiment, but they may be the same object.

(7) The tactile presentation device 50 may include a device that presents a sense of force.

(8) The images are displayed in 2D, and the match/mismatch of the images (whether or not the images are in contact) is checked using 2D coordinates. In order to create a more realistic feeling, the images may be displayed using a 3D coordinate system.

(9) The display unit 20 may be 3D drawing as well as 2D drawing, and even augmented reality AR (Augmented-Reality) and virtual reality VR (VirtualReality) drawing technologies, and an HMD (HeadMounted Display) can be used as the display unit. When performing 3D rendering from a first-person perspective using the HMD, an avatar that includes at least the part to be rehabilitated may appear in the virtual space, and the user's own physical characteristics may be set for this avatar to create a more realistic feeling.

(10) The present invention can be applied to sports training as well as rehabilitation for physical paralysis disorders caused by stroke or accident. For example, a model is created by measuring the muscle characteristics of another person, such as a target player, and this model data is loaded into the model (inverse model) data storage unit 30. Then, the user continuously may perform training similar to that for rehabilitation, thereby improving their muscles and learning to effectively bring their own muscles closer to another's muscle characteristic pattern.

(11) The above embodiment describes the example of application to the rehabilitation of a patient with muscle paralysis. The invention can also be applied to the rehabilitation of patients who are physically restrained by orthopedic diseases, such as with plaster slab immobilization. Patients restrained by plaster slab and other means have reduced levels of muscle characteristics due to trauma itself or prolonged immobility, as do patients with muscle paralysis at the onset of stroke.

Figure 12A:
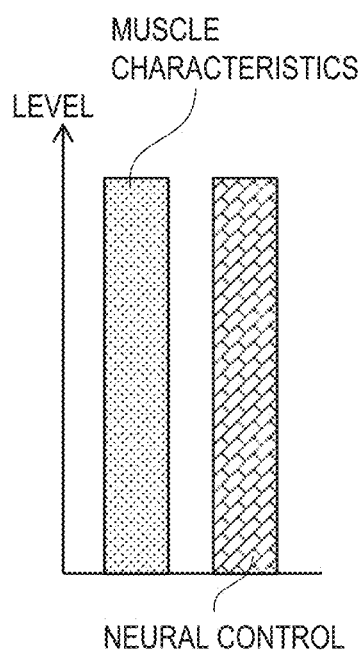
FIG. 12A to FIG. 12C corresponds to FIG. 5A to FIG. 5C and illustrates the general temporal changes in human muscle characteristics and level of neural control over time in orthopedic and other diseases.
Figure 12B:
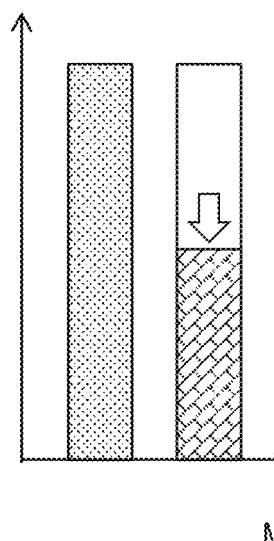
Figure 12C:
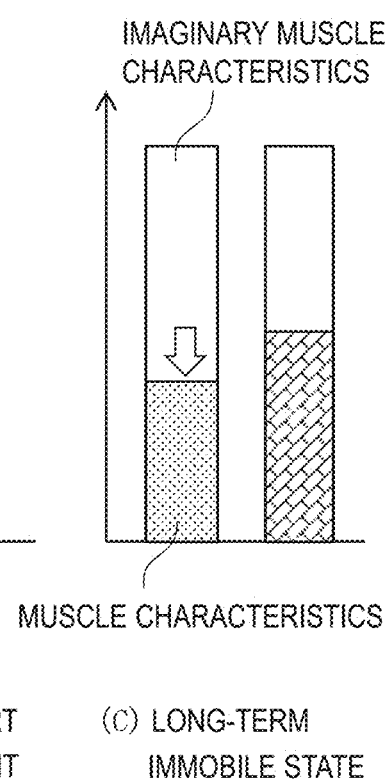

FIG. 12A to FIG. 12C corresponds to FIG. 5A to FIG. 5C and illustrates the general temporal changes in human muscle characteristics and level of neural control over time in orthopedic and other diseases, FIG. 12A in a healthy state, FIG. 12B at the start of restraint due to plaster slab immobilization, etc., and FIG. 12C in a long-term immobile state. In the case of orthopedic diseases with plaster slab immobilization, for example, the patient can receive visual feedback corresponding to their own healthy body through the rehabilitation mode shown in FIG. 1A from the electromyogram produced by isometric contraction of muscles, although no body movement is involved during restraint in rehabilitation. This enables neural system rehabilitation (corresponding to FIG. 6A) to keep the patient from forgetting the body when it was healthy. In the rehabilitation mode shown in FIG. 1B, although the motion itself is difficult to achieve because the affected part is immobilized, muscle activity can be achieved even if the patient is immobilized, thus enabling the patient to experience muscle activity during actual movement (corresponding to FIG. 6B) while being immobilized.

As described above, the electrical stimulation device according to the present invention includes: at least one pair of positive and negative electrodes to be attached to epidermis of agonist-antagonist muscles acting on a target joint; a display unit that displays an image; a first rehabilitation unit that detects an electromyogram of the agonist-antagonist muscles via the electrodes and outputs variation information corresponding to the detected electromyogram to the display unit; a second rehabilitation unit that instructs motion of the agonist-antagonist muscles via the display unit and outputs a stimulation current signal corresponding to the instructed motion of the agonist-antagonist muscles to the electrodes; a model storage unit that stores models obtained beforehand and relating to target muscle characteristics, the models including: a first model with parameters for converting the detected electromyogram into the variation information; and a second model with parameters for converting information on the motion of the agonist-antagonist muscles into the stimulation current signal; and a control unit that selectively executes the first rehabilitation unit and the second rehabilitation unit.

The electrical stimulation method according to the present invention includes: a first rehabilitation step of detecting, via at least one pair of positive and negative electrodes to be attached to epidermis of agonist-antagonist muscles acting on a target joint, an electromyogram of the agonist-antagonist muscles and outputting variation information corresponding to the detected electromyogram to a display unit; a second rehabilitation step of instructing motion of the agonist-antagonist muscles via the display unit and outputting a stimulation current signal corresponding to the instructed motion of the agonist-antagonist muscles to the electrodes; and a control step of selectively executing the first rehabilitation step and the second rehabilitation step. The first rehabilitation step uses a first model that is obtained beforehand and relates to target muscle characteristics, the first model including parameters for converting the detected electromyogram into the variation information. The second rehabilitation step uses a second model that is obtained beforehand and relates to target muscle characteristics, the second model including parameters for converting information on the motion of the agonist-antagonist muscles into the stimulation current signal.

According to these aspects of the invention, target muscle characteristics are acquired in advance. The quantified models having parameters approximating these muscle characteristics are created, so that they can be applied interactively. This effectively implements brain motor re-learning for recovery and improvement in the subsequent rehabilitation and sports training.

Preferably, the target muscle characteristics are acquired at the onset of nerve paralysis. According to this configuration, the muscle characteristics are not degraded at the onset of nerve paralysis, and the muscle characteristics that are almost normal are obtained by quantification, and are further obtained in the form of parameters. Thus, goals for future neuromuscular rehabilitation, which are the healthy state and quantified, are clarified, and thus the patient is able to reacquire the state.

Preferably, the electrical stimulation device of the present invention further includes a first operation unit that sets a gain for amplifying one of the electromyogram and the variation information. According to this configuration, although the movement of the joint is weak at the beginning of neuromuscular paralysis, amplified movement through the gain produces and displays the successful experience on the display, which contributes to effective recovery.

Preferably, the electrical stimulation device of the present invention further includes: an image display control unit that displays a human body object simulating a rehabilitation target part and an index object on the display unit and changes a display position of the human body object according to the variation information and the stimulation current signal; and a tactile presentation device that outputs a tactile sense presentation signal when the display positions of the human body object and the index object match. According to this configuration, a tactile sensation is presented when the human body object and the index object match on the screen. This gives the patient the feeling of touching with the target object while enhancing a realistic feeling.

Preferably, the electrical stimulation device of the present invention further includes a second operation unit that instructs to change display coordinates of the index object. This configuration allows the display coordinates of the index object, which serves as a motion index, to be changed appropriately, thus allows the motion state of the human body object to be changed appropriately, and widens the motion range of the rehabilitation.

Preferably, the electrical stimulation device of the present invention further includes a third operation unit that gives an instruction to output parameters of at least one of the first and second models. According to this configuration, the parameters are known and the status of the musculoskeletal system is known according to the parameters. This allows rehabilitation to the musculoskeletal system to be performed as appropriate, and thus enables rehabilitation of both muscle systems in a balanced manner.

REFERENCE SIGNS LIST

1 Electrical stimulation device
10 Control unit
11 Image display control unit
12 Rehabilitation processing unit (first and second rehabilitation units)
13 Pointer setting unit
14 Difference information calculation unit
15 Conversion unit
16 Gain adjustment unit
102 Pointer operation unit (second operation unit)
103 Operation unit (first and third operation units)
20 Display unit
30 Model (inverse model) data storage unit
30a Model (first model)
30b Inverse model (second model)
40 Input/output unit
41 Electromyogram measurement unit (first rehabilitation unit)
42 Stimulation current generation unit (second rehabilitation unit)
44 Positive and negative electrodes
50 Tactile presentation device
7, 70 Measuring device

The invention claimed is:

1. An electrical stimulation device comprising:
at least one pair of positive and negative electrodes to be attached to epidermis of agonist-antagonist muscles acting on a target joint;
a display unit that displays an image;
a first rehabilitation unit that detects an electromyogram of the agonist-antagonist muscles via the electrodes and outputs variation information corresponding to the detected electromyogram to the display unit;
a second rehabilitation unit that instructs motion of the agonist-antagonist muscles via the display unit and outputs a stimulation current signal corresponding to the instructed motion of the agonist-antagonist muscles to the electrodes;
a model storage unit that stores models obtained beforehand and relating to target muscle characteristics, the models including: a first model with parameters for converting the detected electromyogram into the variation information; and a second model with parameters for converting information on the motion of the agonist-antagonist muscles into the stimulation current signal; and
a control unit that selectively executes the first rehabilitation unit and the second rehabilitation unit.

2. The electrical stimulation device according to claim 1, wherein the target muscle characteristics are acquired at the onset of nerve paralysis.

3. The electrical stimulation device according to claim 1, further comprising a first operation unit that sets a gain for amplifying one of the electromyogram and the variation information.

4. The electrical stimulation device according to claim 1, further comprising: an image display control unit that displays a human body object simulating a rehabilitation target part and an index object on the display unit and changes a display position of the human body object according to the variation information and the stimulation current signal; and a tactile presentation device that outputs a tactile sense presentation signal when the display positions of the human body object and the index object match.

5. The electrical stimulation device according to claim 1, further comprising a second operation unit that instructs to change display coordinates of the index object.

6. The electrical stimulation device according to claim 1, further comprising a third operation unit that gives an instruction to output parameters of at least one of the first and second models.

7. An electrical stimulation method comprising:
a first rehabilitation step of detecting, via at least one pair of positive and negative electrodes to be attached to epidermis of agonist-antagonist muscles acting on a target joint, an electromyogram of the agonist-antagonist muscles and outputting variation information corresponding to the detected electromyogram to a display unit;
a second rehabilitation step of instructing motion of the agonist-antagonist muscles via the display unit and outputting a stimulation current signal corresponding to the instructed motion of the agonist-antagonist muscles to the electrodes; and
a control step of selectively executing the first rehabilitation step and the second rehabilitation step,
the first rehabilitation step using a first model that is obtained beforehand and relates to target muscle characteristics, the first model including parameters for converting the detected electromyogram into the variation information, the second rehabilitation step using a second model that is obtained beforehand and relates to target muscle characteristics, the second model including parameters for converting information on the motion of the agonist-antagonist muscles into the stimulation current signal.

8. The electrical stimulation method according to claim 7, wherein the target muscle characteristics are acquired at the onset of nerve paralysis.

\* \* \* \* \*